United States Patent [19]

Izumitani et al.

[11] Patent Number: 4,873,811
[45] Date of Patent: Oct. 17, 1989

[54] SHREDDER

[75] Inventors: Masayoshi Izumitani; Akihiro Soga, both of Nara, Japan

[73] Assignee: Sharp Kabushiki Kaisha, Osaka, Japan

[21] Appl. No.: 239,026

[22] Filed: Aug. 29, 1988

Related U.S. Application Data

[63] Continuation of Ser. No. 47,766, May 8, 1987, abandoned.

[30] Foreign Application Priority Data

May 13, 1986 [JP] Japan ................................. 61-72427

[51] Int. Cl.⁴ ............................................. B65B 51/06
[52] U.S. Cl. ................................... 53/138 A; 53/583; 241/100; 312/26; 312/211
[58] Field of Search .................. 53/138 A, 583, 417; 312/22, 23, 24, 26, 211; 241/100; 49/70

[56] References Cited

U.S. PATENT DOCUMENTS

| | | | |
|---|---|---|---|
| 2,510,357 | 6/1950 | Wilson | 312/23 |
| 2,527,407 | 10/1950 | Dunn | 312/23 X |
| 2,882,663 | 4/1959 | Leighton | 53/583 |
| 2,908,123 | 10/1959 | Muller | 53/417 X |
| 3,729,896 | 5/1973 | Lehman | 53/583 |
| 4,312,549 | 1/1982 | Ravanelle | 312/23 X |

Primary Examiner—John Sipos
Attorney, Agent, or Firm—Flehr, Hohbach, Test, Albritton & Herbert

[57] ABSTRACT

An improved shredder has a closing device stored inside of its housing or inside a door. As the door is opened to pull out a bag filled with shredded paper, the bag closing device automatically protrudes and the operator has only to grab the top parts of the bag and press them through a groove made in the bag closing device and an adhesive tape wraps around the bag to close it.

3 Claims, 6 Drawing Sheets

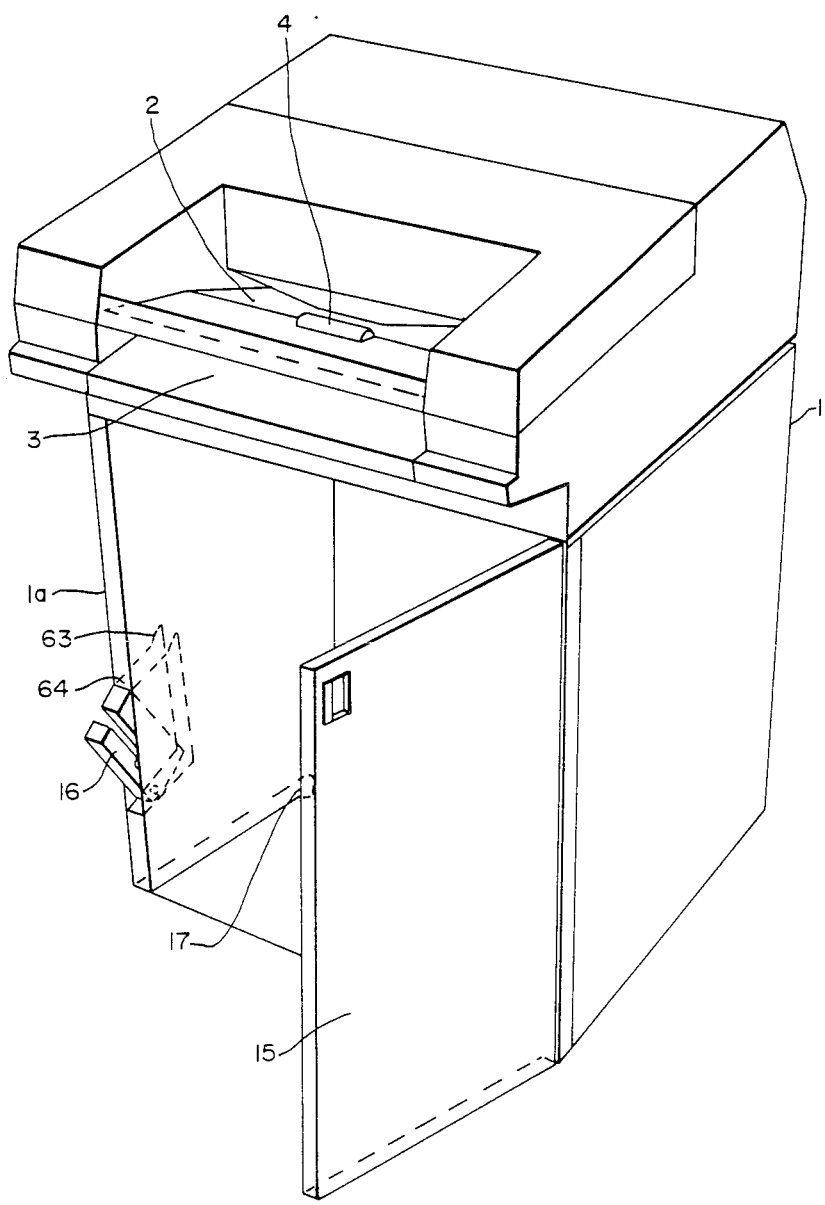
FIG.—1

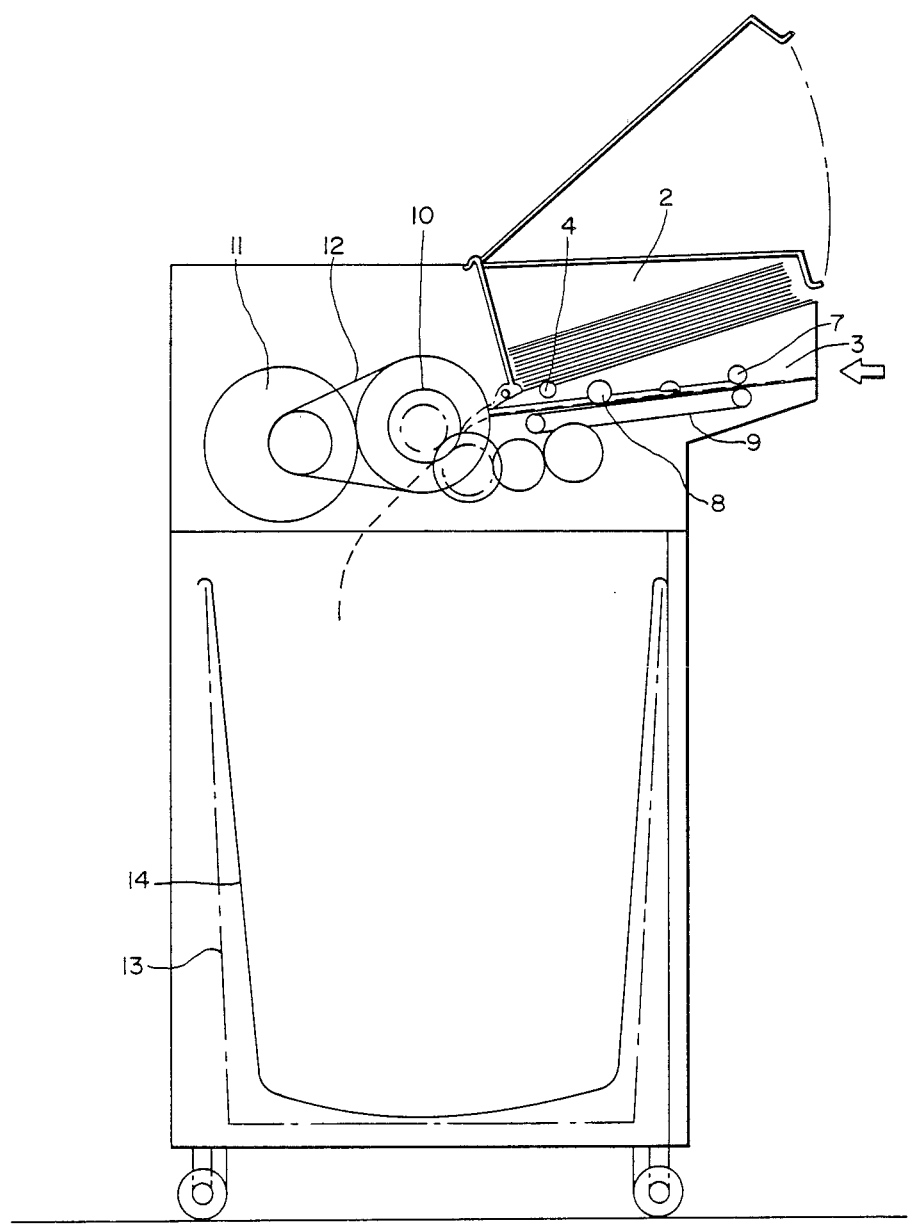
FIG.—2

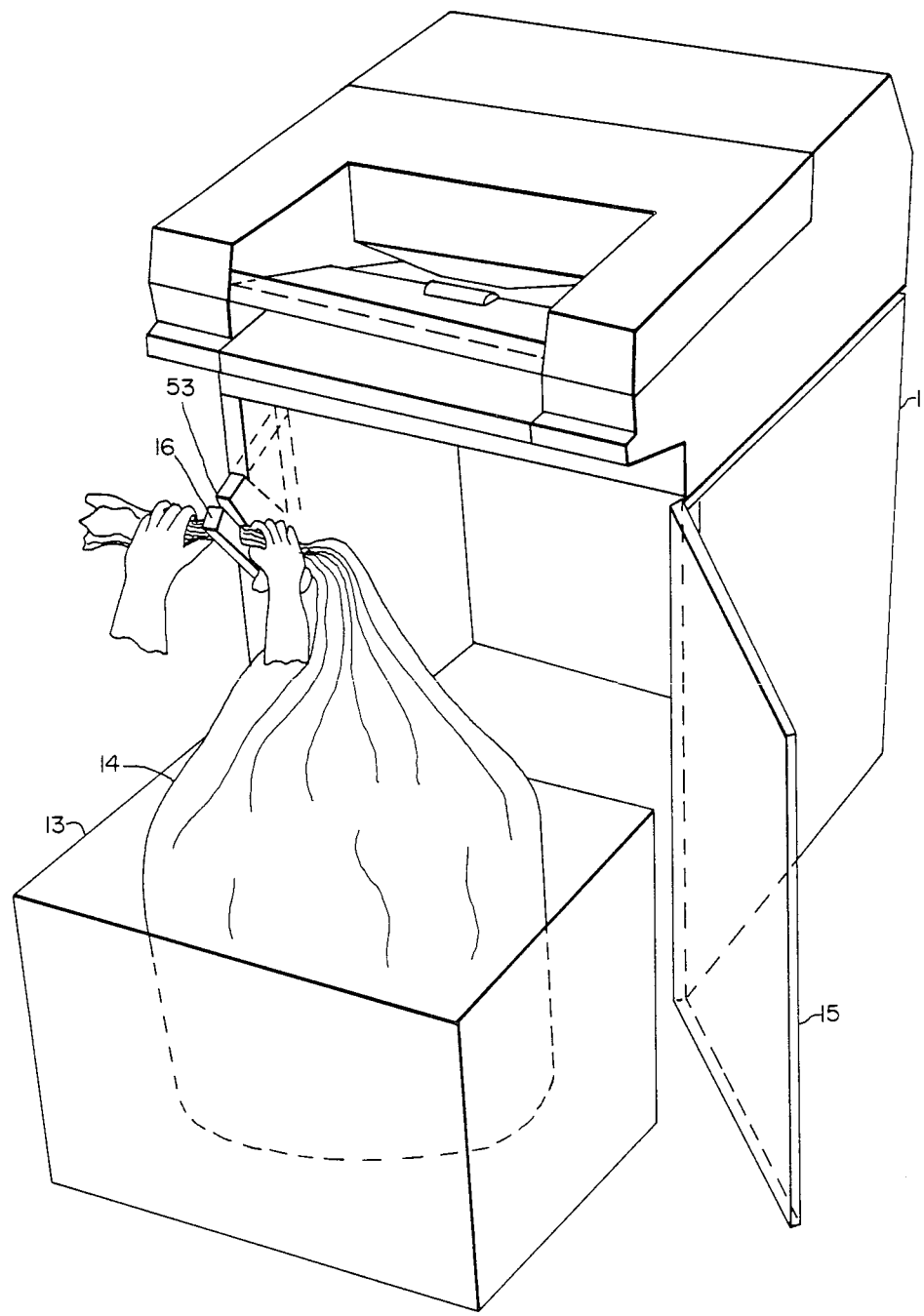
FIG.—3

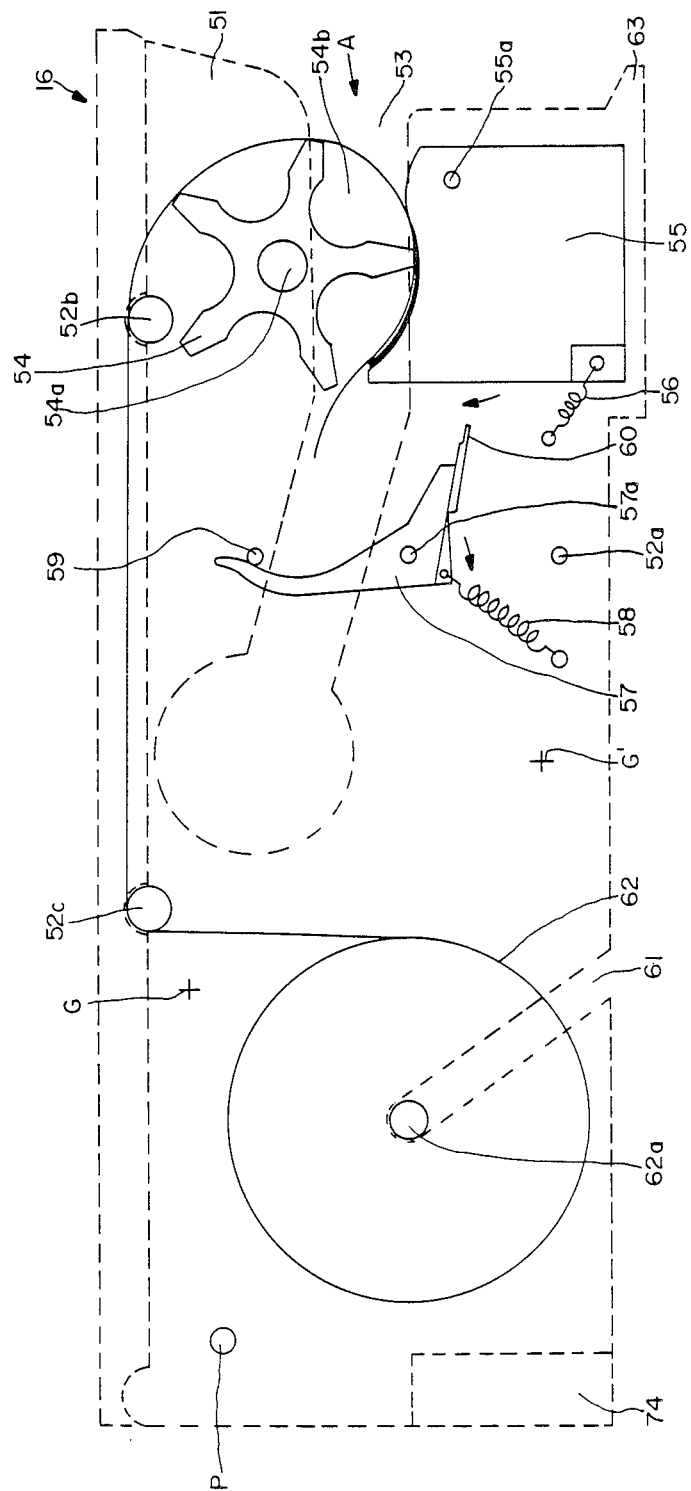
FIG.—4

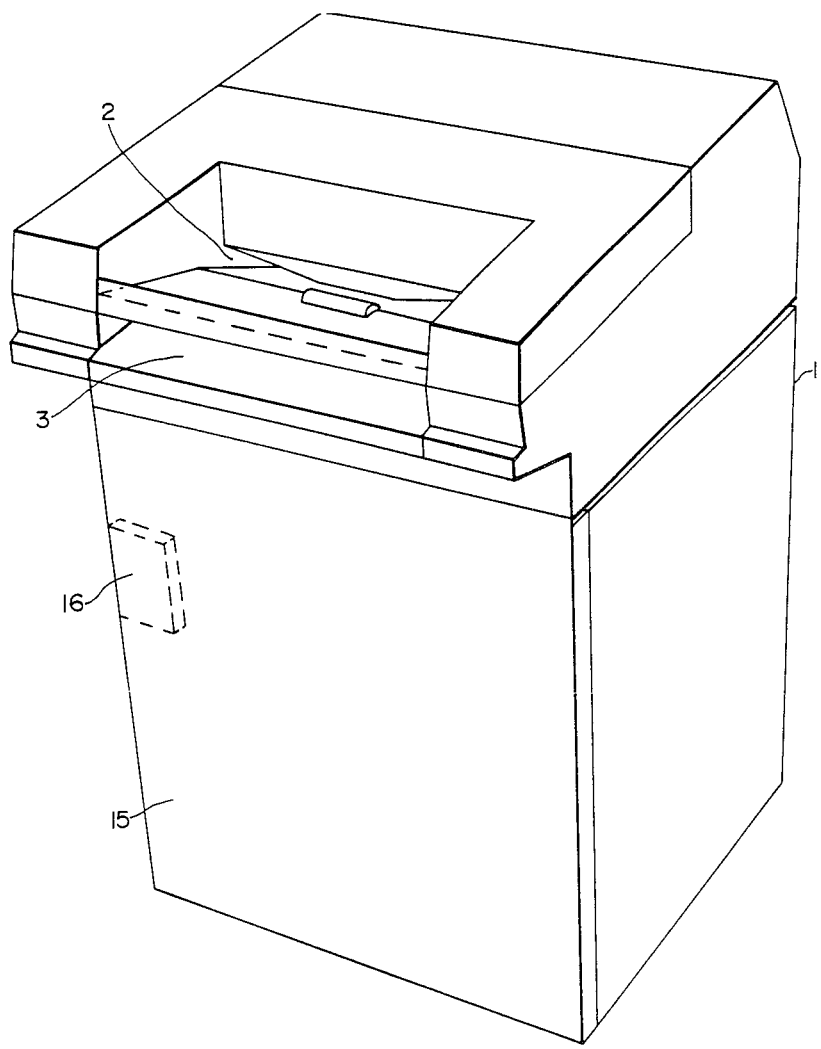
FIG.—5

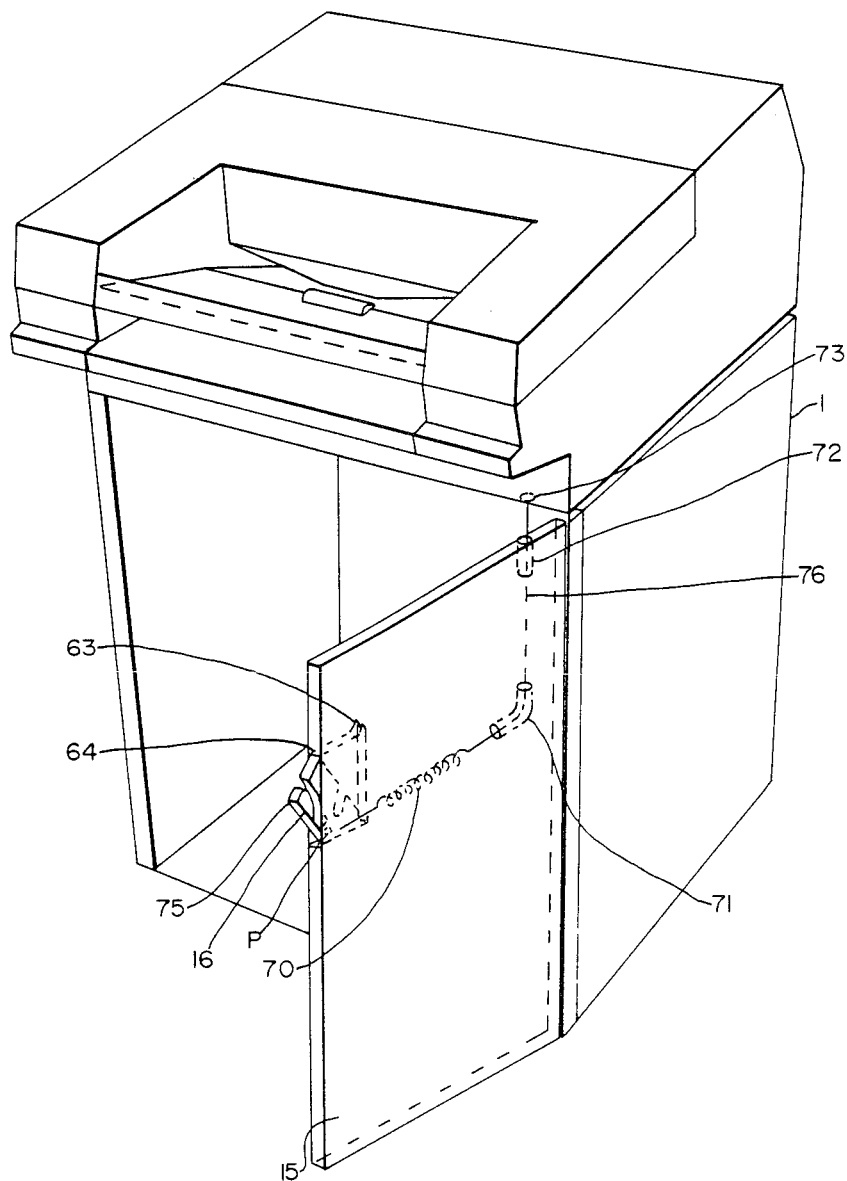
FIG.—6

SHREDDER

This is a continuation, of application Ser. No. 047,766 filed May 8, 1987 now abandoned.

BACKGROUND OF THE INVENTION

This invention relates to an improved shredder for shredding documents and the like.

It has been a common practice to use a shredder as a security measure to shred secret documents or the like before they are disposed of. With the recent increase in the amount of information being stored and exchanged, the bulk of documents to be disposed of is rapidly increasing and a demand for an improved shredder is also increasing. With a conventional shredder, shredded pieces (hereinafter referred to as chips) must be manually stuffed inside a plastic bag or the like so that they can be carried to an incinerator. Not only is this a cumbersome job but paper powder and shredded strips tend to scatter around the shredder or become attached to the operator's hands.

SUMMARY OF THE INVENTION

It is therefore an object of the present invention to provide an improved shredder which simplifies the work of stuffing shredded chips into a bag.

The above and other objects of the present invention are achieved by providing a shredder which comprises not only a housing with a door and a bag for accepting shredded pieces of paper but also a bag closing device attached either to the housing near the opening between the door and the housing or to the door itself. The bag closing device is so attached that it is normally contained inside a wall of the housing or the door but is automatically pulled out when the door is opened to remove the bag. A pulley with indentations along its periphery and an adhesive tape are provided so that the bag can be closed efficiently as it is removed.

BRIEF DESCRIPTION OF THE DRAWINGS

The accompanying drawings, which are incorporated in and form a part of the specification, illustrate embodiments of the present invention and, together with the description, serve to explain the principles of the invention. In the drawings:

FIG. 1 is a perspective view of a shredder embodying the present invention,

FIG. 2 is a schematic sectional view of the shredder of FIG. 1,

FIG. 3 is a perspective view of the shredder of FIG. 1 to show the method of using the bag closing device, FIG. 4 is a sectional side view of the bag closing device embodying the present invention for showing its structure, FIG. 5 is a perspective external view of another shredder embodying the present invention when its door is closed, and FIG. 6 is a perspective external view of the shredder of FIG. 5 when its door is opened.

Before the description of the present invention proceeds, it is to be noted that like parts are designated by like reference numerals throughout the views of the accompanying drawings.

DETAILED DESCRIPTION OF THE INVENTION

With reference to FIGS. 1 through 4, a shredder according to one embodiment of the present invention has both an inlet 2 for sheet-like paper materials and another inlet 3 for computer printouts at the upper part of a housing 1. Sheets of paper thrown in through the paper sheet inlet 2 are transported by a feeder roller 4 and printouts thrown in through the printout inlet 3 are transported by transporting rollers 7 and 8 as well as the rotation of a conveyor belt 9 selectively in the direction of a cutter 10 equipped with rotary blades which serve to shred them. The cutter 10 is operated by a motor 11 with its driving force transmitted through a chain. Chips thus produced by the operation of the cutter 10 drop by their own weight into a bag 14 set inside a chip box 13 which is disposed inside the housing 1.

In order to take the chip box 13 as well as the bag 14 out of the housing 1, the front surface of the housing 1 is provided with a door 15 which is supported rotatably around a vertical axis along one of its sides such that it can be opened and closed. Near the opening of the door 15, or on a side wall 1a facing the side of the door 15 distal from the axis of rotation for the door 15, there is provided a bag closing device 16 for closing the bag 14 when the door 15 is opened. The bag closing device 16 is normally contained inside the sidewall 1a and is supported thereby around an axis P as shown in FIG. 4 so as to be freely retractable. The center of gravity of the closing device 16 is at the position indicated by G in FIG. 4 such that, when the door 15 is opened, the bag closing device 16 rotates around the axis P by its own weight until a protrusion 63 at one side of the closing device 16 strikes a stopper 64 provided on the side wall 1a and assumes the position depicted by solid lines in FIG. 1. When the door 15 is closed after the bag closing device 16 has been used, the bag closing device 16 is pushed by the door 15 and rotates until it assumes the position depicted by broken lines in FIG. 1. The door 15 is provided with a magnet 17 and thereby attracted to the housing 1. Thus, the door 15 is kept closed while the shredder is in use.

When the chip box 13 becomes full and it is desired to empty the bag 14, the door 15 is opened and the box 13 is pulled out of the housing 1 as shown in FIG. 3. The operator then holds the upper edge of the bag 14, twists it and presses it down as shown in FIG. 3 along a groove 53 formed in the bag closing device 16 which comes out of the sidewall 1a as the door 15 is opened. The bag closing device 16 is so positioned as to be just above the box 13 when it is pulled out of the housing 1.

As shown in FIG. 4, the bag closing device 16 comprises a pair of side plates 51 held together in a mutually parallel relationship by a plurality of connecting rods 52 to form a unistructural frame. A groove 53 of an appropriate depth is formed from the top edge of each side plate 51. A tape guide pulley 54 is supported by the side plates 51 rotatably around an axis 54a. The tape guide pulley 54 is provided with a plurality of evenly spaced indentations 54b for engaging an object to be wrapped around such as the bag 14. A tape guide 55 is disposed also near the top edge of the plate 51 and in contact with the tape guide pulley 54 through an adhesive tape. The tape guide 55 is supported rotatably around its axis 55a and is biased by a spring 56 in such a way as to control the rotary motion of the tape guide pulley 54. One end of a cutter guide 57, which is supported rotatably around its axis 57a, protrudes into the center section of the groove 53 and is normally pressed against a stopper 59 by means of another biasing spring 58. A tape cutter 60 for cutting the adhesive tape is attached to the other end of the cutter guide 57. The deep end of the aforementioned groove 53 is made wider into a circular shape such that the closed bag can be pulled out of it easily. Diagonal grooves 61 are provided to the right-hand side surfaces of the side plates 51 such that a central axis 62a around which an adhesive tape 62 is wound can be detachably inserted therealong.

The adhesive tape 62 is wound with its adhesive surface facing the inward direction and is introduced between the tape guide pulley 54 and the tape guide 55 from above such that the adhesive surface faces the upward direction. The tape 62 thus set is pressed between the tape guide pulley 54 and the tape guide 55 near an end section as shown in FIG. 4, the adhesive surface sticking to the tape guide 55. If the adhesive tape 62 is thus set and the closed upper edge of the bag 14 is twisted to make it thin and pressed into the groove 53 of the bag closing device 16, the bag 14 causes the tape guide pulley 54 to turn in the clockwise direction (with respect to FIG. 4) while it presses the tape 62 into one of the indentations 54b of the tape guide pulley 54. As the twisted upper edge of the bag 14 passes in this manner between the tape guide pulley 54 and the tape guide 55, the tape 62 is unwound from the axis 62a and wrapped around the bag 14. At the same time, the end part of the tape 62 attached to the tape guide 55 becomes further wrapped over the part of the tape drawn from the axis 62a.

If the bag 14, thus wrapped around by the tape 62, is further pressed downward, the end section of the tape 62 is separated from the tape guide 55. Thereafter, the bag 14 presses down the cutter guide 57 so as to rotate it in the counter-clockwise direction (with respect to FIG. 4) around its axis 57a, opposing the force of the biasing spring 58 until the tape cutter 60 attached to one end thereof moves into the groove 53. This causes not only the tape 62 to wrap around the bag 14 but also the tape cutter 60 to cut the tape 62. If the bag 14 is pressed still further downward, the cutter guide 57 returns to the original position shown in FIG. 4 by the biasing force of the spring 58 because the cutter guide 57 ceases to be engaged with the bag 14.

FIG. 5 shows a shredder according to another embodiment of the present invention characterized as having the bag closing device 16 set on the door 15 such that the bag closing device 16 automatically sticks out of the door 15 when the door 15 is opened as shown in FIG. 6. With reference now to FIG. 6, the bag closing device 16 according to this embodiment of the present invention is supported rotatably by the door 15 around an axis P. When the bag closing device 16 is being used, a protrusion 63 from the bag closing device 16 is in contact with a stopper 64 on the door 15 such that the bag closing device 16 takes the position depicted by solid lines. When the bag closing device 16 is not in use, on the other hand, another protrusion 75 of the bag closing device 16 comes into contact with the stopper 64 such that the bag closing device 16 assumes the position depicted by broken lines. One end of a spring 70 is fastened to the bag closing device 16 below the axis P, the other end of the spring 70 being connected to a wire 76. The other end of this wire 76 is fastened through wire guides 71 and 72 onto the housing 1 at a fixed point 73 opposite to the door 15. The lengths of the spring 70 and the wire 76 are so determined that no tensile force is exerted on the spring 70 when the door 15 is closed but the spring 70 will experience a tensile force when the door 15 is opened. The center of gravity of the bag closing device 16 shown in FIG. 6 is at a different position indicated by G' in FIG. 4. This is achieved by providing a weight 74, for example, to the side plates.

With a shredder thus formed, the distance between the fixed point 73 and the spring guide 72 increases when the door 15 is opened. This causes the spring 70 to be pulled by the wire 76 and the bag closing device 16 to rotate until the protrusion 63 comes into contact with the stopper 6 and the bag closing device 16 comes to the position depicted by solid lines in FIG. 6. When the door 15 is closed, the distance between the fixed point 73 and the spring guide 72 becomes shorter and the spring 70 ceases to experience any tensile force. The bag closing device 16 therefore rotates in the reverse direction by its own weight until the protrusion 75 comes into contact with the stopper 64 and the bag closing device 16 is contained inside the door 15.

With a shredder embodying the present invention, the operator has only to open the door, grab the upper edge of the bag 14 and press it against the bag closing device provided near the opening of the door (either on the sidewall of the housing or on the door itself). The bag can thus be sealed with a series of easy operations. The operator does not have to dirty his hands and the work can be completed efficiently. With a conventional shredder, materials to be shredded are usually piled on top and there is no convenient place to store a device for closing a bag. With a shredder of the present invention, the bag closing device comes out of the housing or the door only when the door is opened to pull out the filled bag. When it is not needed, It automatically disappears as the door is closed. Thus, the problem of finding a convenient place to keep the bag closing device near the shredder is eliminated by the present invention. In summary, The present invention successfully simplifies the chip disposal work.

What is claimed is:

1. In a shredder having a housing which contains a bag therein for holding shredded materials and a door for opening and closing an opening in said housing through which said bag is removed from inside said housing, the improvement wherein said shredder further comprises a bag closing device retractably attached to said housing near said opening such that said bag closing device is normally contained inside said housing and is automatically moved, when said door is opened, to an operative position at which said bag closing device is operable.

2. In a shredder having a housing which contains a bag therein for holding shredded materials and a door for opening and closing an opening in said housing through which said bag is removed from inside said housing, the improvement wherein said shredder further comprises a bag closing device, said bag closing device is retractably attached to said door such that said bag closing device is normally contained inside said door and is automatically moved, when said door is opened, to an operative position at which said bag closing device is operable.

3. In a shredder having a housing which contains a bag therein for holding shredded materials and a door for opening and closing an opening in said housing through which said bag is removed from inside said housing, the improvement wherein said shredder further comprises a bag closing device, said bag closing device is displaceably attached to said shredder so as to selectably take an operative position and a non-operative position, depending on whether said door opens or closes said opening, and to move from said non-operative position to said operative position by its own weight when said door is opened.

* * * * *